US009065831B2

(12) United States Patent
Ghosh et al.

(10) Patent No.: US 9,065,831 B2
(45) Date of Patent: Jun. 23, 2015

(54) ACTIVE LOAD DISTRIBUTION FOR CONTROL PLANE TRAFFIC USING A MESSAGING AND PRESENCE PROTOCOL

(75) Inventors: Arpan K. Ghosh, Mountain View, CA (US); Sumeet Singh, Saratoga, CA (US); Sukhdev S. Kapur, Saratoga, CA (US); Subrata Banerjee, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 728 days.

(21) Appl. No.: 13/037,437

(22) Filed: Mar. 1, 2011

(65) Prior Publication Data

US 2012/0226797 A1  Sep. 6, 2012

(51) Int. Cl.
| | |
|---|---|
| *G06F 15/16* | (2006.01) |
| *G06F 11/00* | (2006.01) |
| *H04L 29/08* | (2006.01) |
| *H04L 12/58* | (2006.01) |
| *H04L 12/18* | (2006.01) |

(52) U.S. Cl.
CPC .......... *H04L 67/1008* (2013.01); *H04L 51/043* (2013.01); *H04L 12/1822* (2013.01); *H04L 12/1877* (2013.01); *H04L 67/24* (2013.01); *H04L 67/1036* (2013.01)

(58) Field of Classification Search
CPC ..... H04L 67/06; H04L 67/10; H04L 67/1008; H04L 67/1014; H04L 67/1029; H04L 67/1031; H04L 67/1034; H04L 67/1036; H04L 67/1023; H04L 67/1097; H04L 63/00; H04L 63/168; H04L 29/08144; H04L 29/08153; H04L 29/08261; H04L 29/08297

USPC ......... 709/217–219, 224, 227, 229–230, 233; 714/2, 4.11, 48
See application file for complete search history.

(56) References Cited

U.S. PATENT DOCUMENTS

| | | | |
|---|---|---|---|
| 6,259,705 B1 * | 7/2001 | Takahashi et al. ............ | 370/465 |
| 2005/0033843 A1 * | 2/2005 | Shahi et al. .................. | 709/226 |
| 2005/0215265 A1 * | 9/2005 | Sharma ........................ | 455/453 |
| 2006/0212532 A1 * | 9/2006 | Burckart et al. ............. | 709/217 |

(Continued)

OTHER PUBLICATIONS

Java Message Service API Tutorial, by Kim Haase (2002), Sun Microsystems, Inc., (278 pages).

(Continued)

*Primary Examiner* — Emmanuel L Moise
*Assistant Examiner* — Farzana Huq
(74) *Attorney, Agent, or Firm* — Edell, Shapiro & Finnan, LLC

(57) ABSTRACT

Techniques are provided herein for a device in a network to receive information configured to indicate a control plane traffic load level for one or more server devices that are configured to manage traffic for messaging and presence clients communicating via a messaging and presence protocol. The control plane traffic is associated with the messaging and presence protocol. A determination is made as to when the control plane traffic load level has become unbalanced among the two or more server devices and in response to determining that the control plane traffic load level has become unbalanced, sending a transfer message to one or more clients comprising information configured to initiate migration of one or more clients from a server device that is relatively overloaded to a server device that is relatively underloaded in order to balance the control plane traffic load level among the two or more server devices.

22 Claims, 8 Drawing Sheets

(56) References Cited

U.S. PATENT DOCUMENTS

| | | | |
|---|---|---|---|
| 2006/0242300 A1* | 10/2006 | Yumoto et al. | 709/226 |
| 2007/0121490 A1* | 5/2007 | Iwakawa et al. | 370/218 |
| 2008/0086567 A1* | 4/2008 | Langen et al. | 709/230 |
| 2009/0245113 A1* | 10/2009 | Kamiya | 370/238 |
| 2011/0173324 A1* | 7/2011 | Wang et al. | 709/225 |
| 2011/0289162 A1* | 11/2011 | Furlong et al. | 709/206 |
| 2012/0224486 A1* | 9/2012 | Battestilli et al. | 370/237 |
| 2013/0044741 A1* | 2/2013 | Lappetelainen et al. | 370/338 |
| 2013/0080517 A1* | 3/2013 | T'Syen et al. | 709/203 |

OTHER PUBLICATIONS

XMPP XEP-0051: Connection Transfer, Klaus Wolf et al., (1999), XMPP Standards Foundation, (5 pages).

* cited by examiner

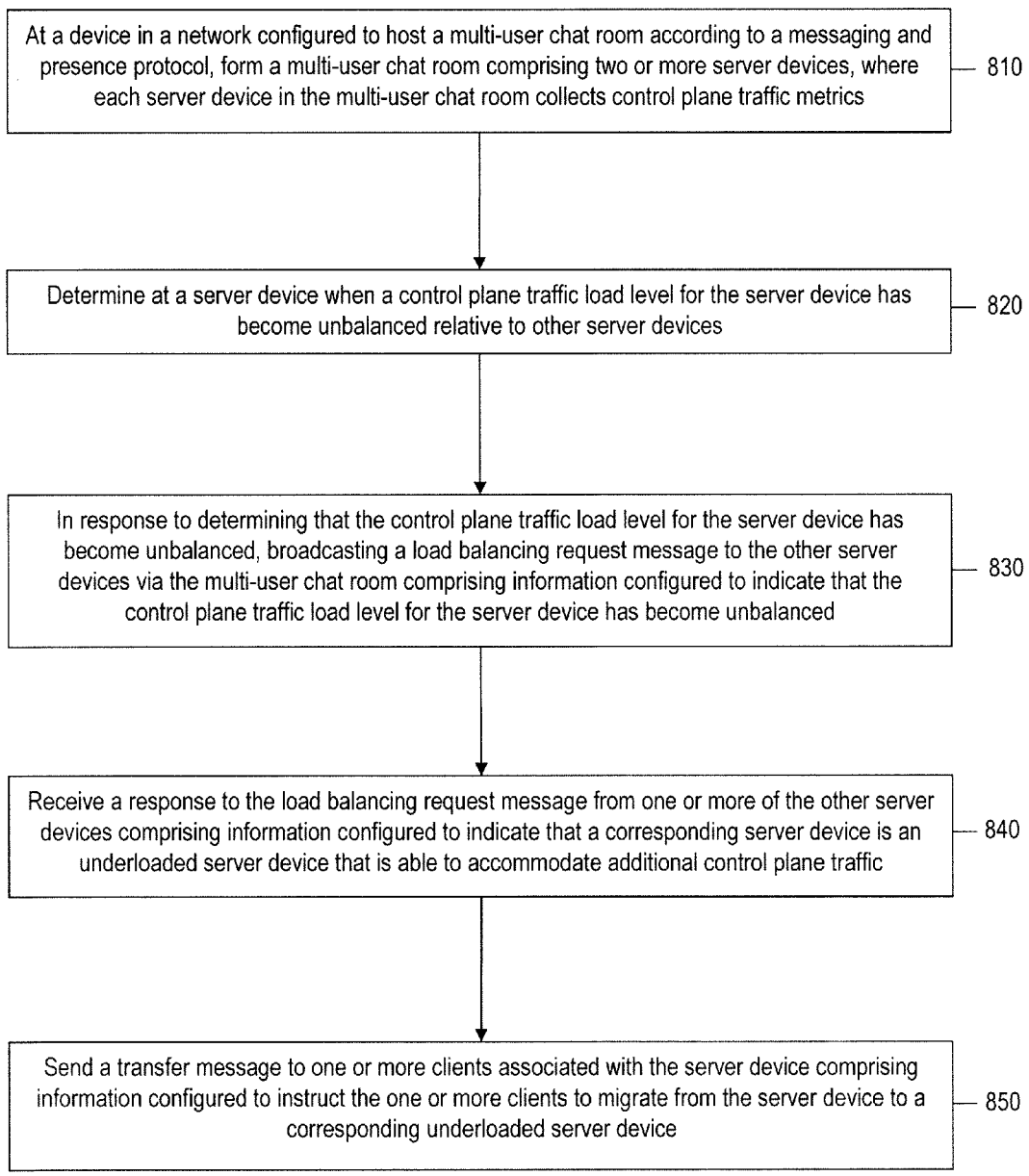

ACTIVE LOAD DISTRIBUTION FOR CONTROL PLANE TRAFFIC USING A MESSAGING AND PRESENCE PROTOCOL

TECHNICAL FIELD

The present disclosure generally relates to messaging and presence control plane traffic, and more specifically to load balancing control plane traffic by leveraging the features of a messaging and presence protocol.

BACKGROUND

Instant messaging (IM) has grown from simple messaging in the 1960's, bulletin board systems of the 1980's, and messaging applications of the 1990's, into the field of unified communications, which provides real-time communications services such as unified messaging (integrated email, voicemail, fax, instant messaging, and presence information), telephony, and video conferencing. Enabling many of these IM features are a number of messaging and presence protocols, such as Instant Messaging and Presence Service (IMPS), Extensible Messaging and Presence Protocol (XMPP), and Session Initiation Protocol (SIP) with its extension SIP for Instant Messaging and Presence Leveraging Extensions (SIMPLE), to name a few.

These protocols allow the establishment of an IM session that may include IM, file transfer, voice, and video. Underlying these protocols is the concept of "presence" which indicates a user's willingness, capacity, or ability to communicate. Before one can initiate an IM session with another, one must ascertain the status of the other, e.g., "off-line", "busy", or "do not disturb". Presence information is periodically shared across the network, while IM is event driven, i.e., nothing happens until a user takes action. Both IM and presence can be used to send a variety of types of information.

BRIEF DESCRIPTION OF THE DRAWINGS

FIG. 8 is an example flowchart generally depicting the decentralized control plane traffic load balancing process.

DESCRIPTION OF EXAMPLE EMBODIMENTS

Overview

Techniques are provided herein for a device in a network to receive information configured to indicate a control plane traffic load level for two or more server devices that are configured to manage traffic for messaging and presence clients communicating via a messaging and presence protocol. The control plane traffic is associated with the messaging and presence protocol. A determination is made as to whether the control plane traffic load level has become unbalanced among the two or more server devices and in response to determining that the control plane traffic load level has become unbalanced, sending a transfer message to one or more clients comprising information configured to initiate migration of one or more clients from a server device that is relatively overloaded to a server device that is relatively underloaded in order to balance the control plane traffic load level among the two or more server devices.

It may also be determined when the control plane traffic load level for the server device exceeds a predetermined threshold, and in response to determining that the control plane traffic load level for the server device exceeds the predetermined threshold, broadcasting a load balancing request message, e.g., to a multi-user chat room associated with the messaging and presence protocol. In other examples, it is determined when the control plane traffic load level for the server device exceeds a dynamically determined threshold. The dynamically determined threshold is adjusted dynamically based on the collective load levels of the two or more servers, and in response to determining that the control plane traffic load level for the server device exceeds the dynamically determined threshold, the load balancing request message is broadcast.

The control plane traffic load level may be determined by one or more parameters that include a number of control plane traffic messages per unit of time, a number of control plane traffic messages for each client, processor utilization, or memory utilization. The size of control plane traffic messages may be subdivided by a predetermined unit size, where the number of control plane traffic messages per unit of time and the number of control plane traffic messages is determined based on the predetermined unit size.

Example Embodiments

Figure 1:
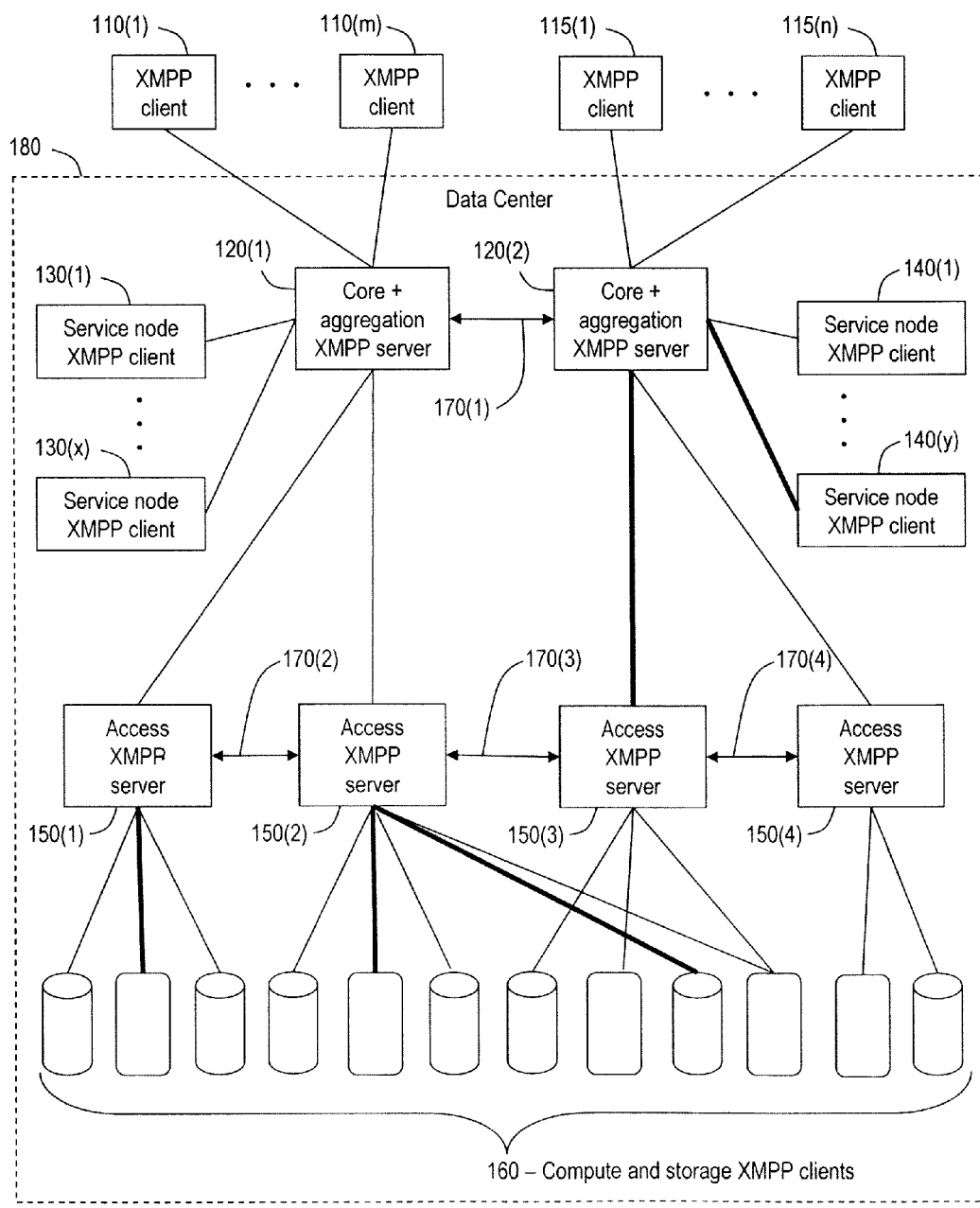
FIG. 1 is an example diagram of a network with a plurality of XMPP clients and XMPP servers in which the XMPP servers are configured to load balance XMPP control plane traffic.

Referring first to FIG. 1, a diagram of a network 100 is shown that is configured to serve a plurality of messaging and presence protocol clients. In this example, the messaging and presence protocol is the XMPP protocol. The network 100 serves a number of internal data center and external (or third-party) XMPP clients via access XMPP servers 150(1)-150(4) and core and aggregation servers 120(1) and 120(2). The external XMPP clients 110(1)-110(m) and 115(1)-115(n) are served by core and aggregation servers 120(1) and 120(2), respectively, and may number in the thousands. The internal service node XMPP clients 130(1)-130(x) and 140(1)-140(y) are also served by core and aggregation servers 120(1) and 120(2), respectively. The network 100 has a number of compute and storage XMPP clients shown collectively at reference numeral 160 that are served by access XMPP servers 150(1)-150(4). The external XMPP clients vis-à-vis the internal XMPP clients are delineated by the dashed line 180 that forms a data center boundary.

Each line that connects the XMPP clients to the respective server represents control plane traffic and not traffic associated with the data plane, i.e., the lines do not represent media connections. The thickness of each line indicates the level or volume of control plane traffic; the thicker the line the higher volume of control plane traffic. The control plane traffic may include capability advertisements of various data sizes between client and server. Thus, the size and frequency of the advertisements determines the relative amount of control plane traffic between each client and server.

When a client connects to an XMPP server, a Domain Name Server (DNS) lookup is performed. Based on the DNS lookup the client gets assigned to a server. The DNS lookup mechanism may assign clients to a server according to a predetermined scheme, e.g., the clients may be assigned to servers in a round-robin fashion or based on the proximity of the client to the server. At the time of client to server assignment, the DNS server is not aware of the eventual level of control plane traffic that a particular client may impose on a particular server. Accordingly, some servers may become overloaded with control plane traffic by virtue of being randomly assigned clients that happen to impose a greater control plane traffic burden.

For example, if a particular client "A" publishes a larger number of attributes and publishes them more frequently than client "B", then the XMPP server will need to do more work for client A. Similarly, if client A subscribes to a larger number of publish-subscribe (Pub-Sub) nodes than client B, then the XMPP server will tends to do more work for Client A. These client assignment mechanisms may lead to a situation that particular XMPP servers may be overloaded with client requests and be unable to service the clients, while other XMPP servers may idle away.

To manage load distribution among the various servers, communication links 170(1)-170(4) are provided to exchange load information according to the techniques described herein. Links 170(1)-170(4) allow the servers to exchange real-time load information amongst each other and decide to shift or transfer XMPP clients from highly loaded servers to lightly loaded servers. Alternatively, server control plane traffic load levels may be sent to a central location, e.g., a Network Management Station (NMS) or a designated XMPP server that is configured to manage load for servers in network 100. This real-time control plane traffic redistribution or load balancing process will be generally described in connection with FIGS. 2-6 and described in greater detail in connection with FIGS. 7 and 8. In another example, the clients themselves may monitor the loads of the servers and decide if they should migrate to a least loaded server.

Figure 2:
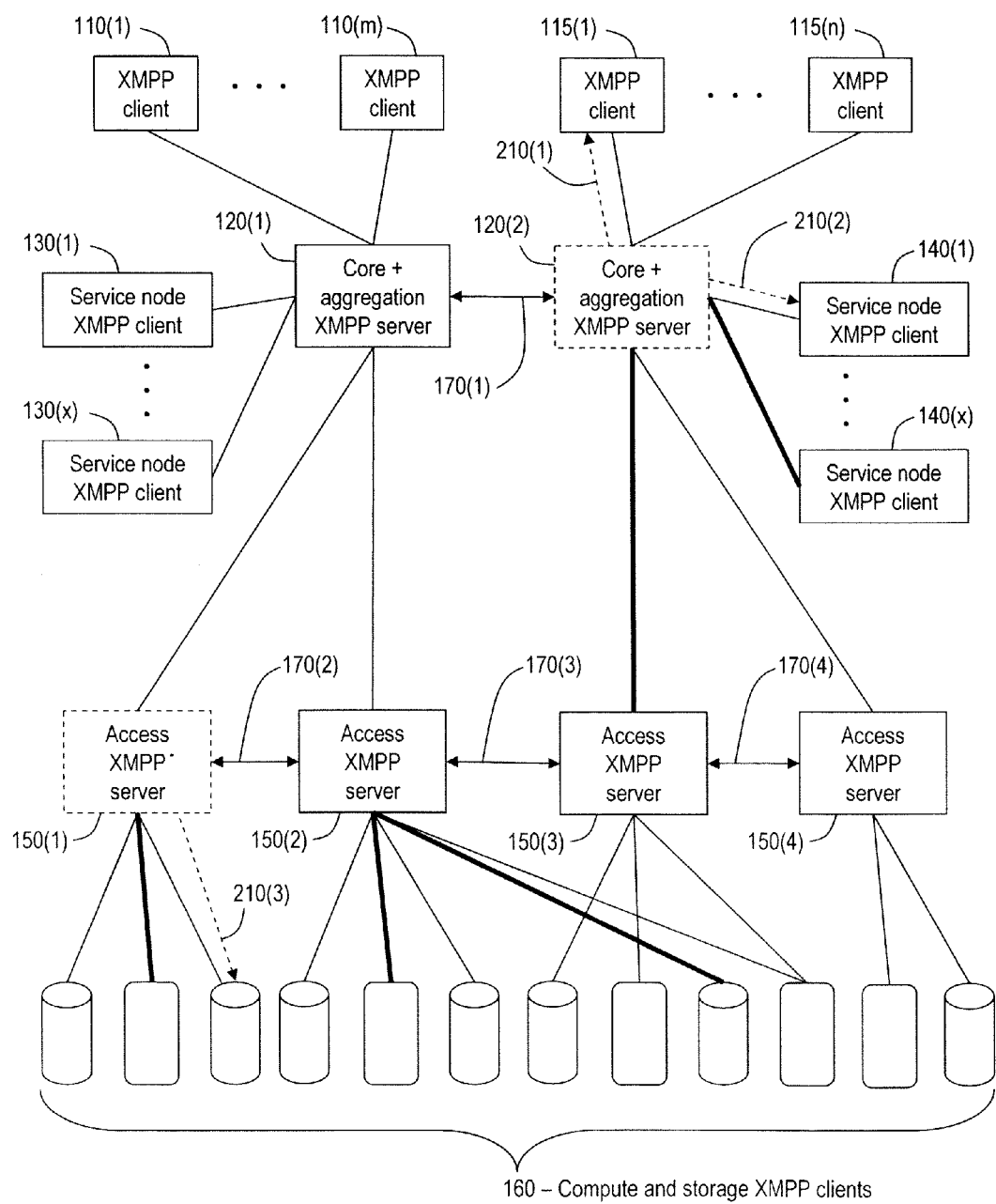
FIG. 2 depicts the network from FIG. 1 in which the XMPP servers are sending XMPP client connection transfer messages to load balance XMPP control plane traffic.

Turning now to FIG. 2, network 100 from FIG. 1 is shown in which the XMPP servers are sending XMPP client connection transfer messages to load balance XMPP control plane traffic. Core and aggregation servers 120(1) and 120(2) have been exchanging XMPP control plane traffic load levels with each other via link 170(1) and access XMPP servers 150(1)-150(4) have been exchanging XMPP control plane traffic load levels with each other via links 170(2)-170(4). In this example, core and aggregation server 120(2) is overloaded with XMPP control plane traffic relative to core and aggregation server 120(1) and access XMPP server 150(1) is overloaded with XMPP control plane traffic relative to access servers 150(2), 150(3), and 150(4), as indicated by the dashed boxes.

Each XMPP server keeps track of the load on a per client basis and exchanges its overall load information with the other XMPP Servers via links 170(1)-170(4). Thus each XMPP server knows what the load and available capacity is for all other XMPP servers. The calculation of the load will take into account parameters such as a rate at which advertisements are published by a XMPP client, the size of the advertisements, the total number of Pub-Sub nodes a particular XMPP client is subscribed to, how frequently those Pub-Sub nodes are updated, and the processor and memory utilization of the XMPP server. In addition, as a server becomes loaded it may become slower to respond, thereby introducing latency. The XMPP control plane traffic may be adjusted to reduce systemic latency.

To alleviate the overloaded condition in core and aggregation server 120(2), the core and aggregation servers 120(1) and 120(2) agree that core and aggregation server 120(2) can transfer XMPP client 115(1) and service node XMPP client 140(1) to core and aggregation server 120(1). Core and aggregation server 120(2) initiates the XMPP client transfers by sending connection transfer messages 210(1) and 210(2) to XMPP client 115(1) and service node XMPP client 140(1), respectively.

The connection transfer messages 210(1) and 210(2) may contain the domain name of core and aggregation server 120(1). The XMPP clients 115(1) and 140(1) receiving the connection transfer messages can perform a DNS lookup using the domain name to obtain the IP address of core and aggregation server 120(1). The XMPP clients 115(1) and 140(1) will then initiate a new session with core and aggregation server 120(1) using the IP address and terminate their sessions with core and aggregation server 120(2), effectively performing control plane traffic load balancing among the core and aggregation servers 120(1) and 120(2). A similar process alleviates the overload condition on access XMPP server 150(1) via connection transfer message 210(3) and effectively achieves control plane traffic load balancing among access XMPP servers 150(1)-150(4).

In another example, control plane traffic load levels for each of the XMPP servers may be sent to a central load management device. The central load management device performs control plane traffic load balancing among core and aggregation servers 120(1) and 120(2) and access XMPP servers 150(1)-150(4) by sending connection transfer messages 210(1)-210(3) to the respective XMPP clients. Alternatively, a central load management device may be designated from among the XMPP servers. For example, core and aggregation server 120(1) or 120(2) may be designated to perform control plane traffic load balancing for core and aggregation servers 120(1) and 120(2), and one of the access servers 150(1), 150(2), 150(3) or 150(4) may be designated to perform control plane traffic load balancing for access servers 150(1)-150(4).

Absent the techniques described herein, devices with embedded systems, e.g., servers 120(1), 120(2), and 150(1)-150(4) would normally be managed individually using Simple Network Management Protocol (SNMP) or through a command line interface (CLI), e.g., through a Telnet or Secure Shell (SSH). These management methods require manual entries by a network operator. However, by virtue of the load balancing techniques described herein the servers can manage their own control plane traffic load levels without a network operator manually reassigning XMPP clients from overloaded XMPP servers to underloaded XMPP servers.

The examples described herein are made with reference to the XMPP protocol. XMPP is used for the examples herein due the extensible nature of the Extensible Markup Language (XML) used by XMPP that allows for a simple description of the load balancing process described in detail hereinafter. These examples are not meant to be limited to any particular protocol. Any protocol that provides or is adaptable to exchanging load balancing information and client connection transfers for messaging and presence clients, e.g., XMPP clients, may be used. Example protocols include open protocols, such as IMPS, XMPP, or SIP/SIMPLE, or proprietary protocols such as Skype or IBM Lotus Sametime, to name a few.

Figure 3:
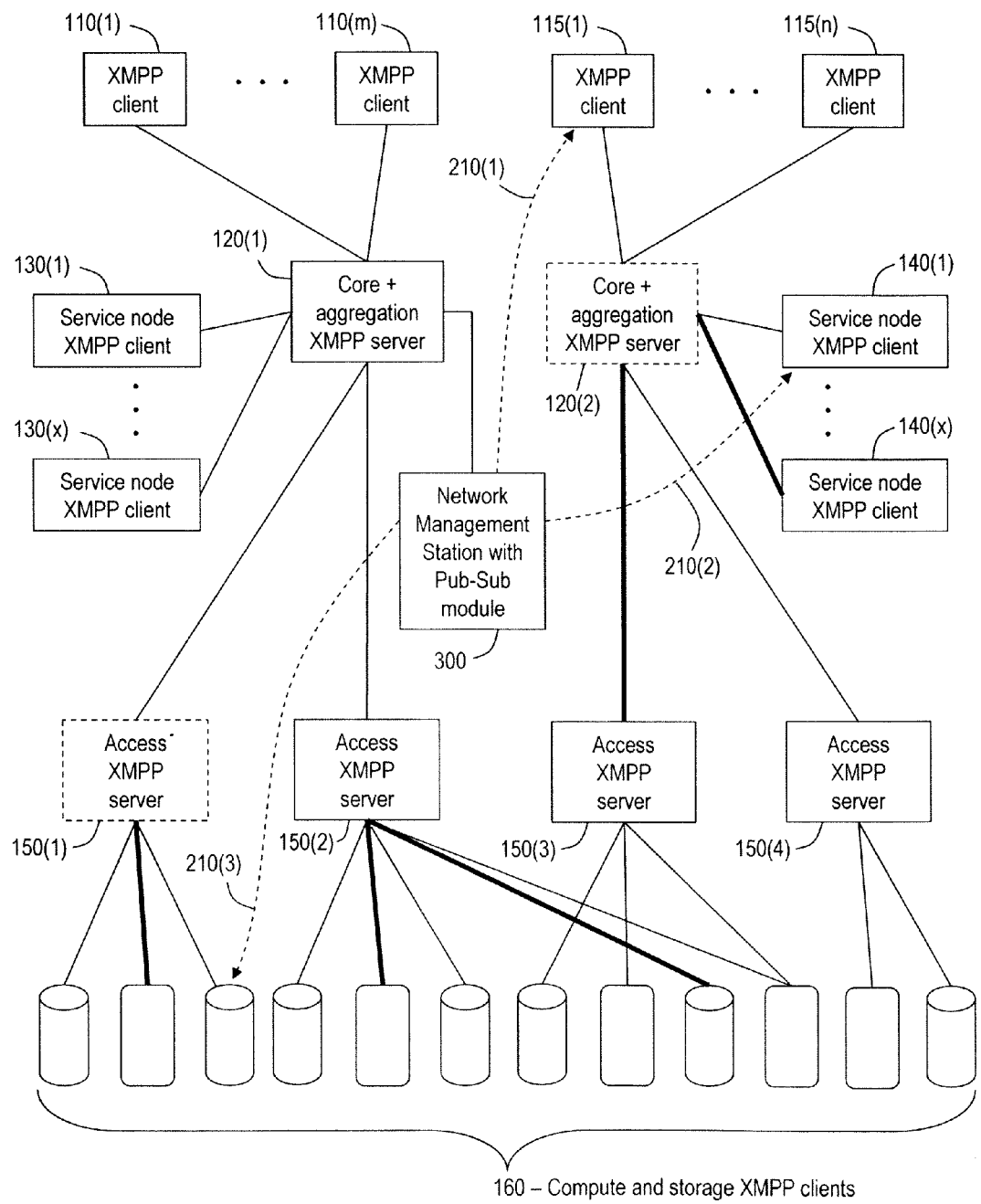
FIG. 3 depicts the network from FIG. 1 in which a centralized network management station sends XMPP client connection transfer messages to load balance XMPP control plane traffic.

Referring to FIG. 3, the network from FIG. 1 is shown in which a centralized network management (NMS) 300 station sends XMPP client connection transfer messages to load balance XMPP control plane traffic. In this example, each of the XMPP servers 120(1), 120(2), and 150(1)-150(4) keeps the NMS 300 apprised of its current control plane traffic load levels and the NMS 300 decides which XMPP clients to transfer from one servicing XMPP server to another. For ease of illustration as shown in FIG. 3, the load balancing considerations are the same as those shown for FIG. 2 and the connection transfer messages 210(1)-210(3) are sent to the same respective XMPP clients.

In this example, NMS 300 hosts a Pub-Sub node or module and a connection transfer module. The Pub-Sub module operates according to conventional messaging and presence publish-subscribe techniques but with a modified protocol that will be described hereinafter. Each of the XMPP servers hosts a load balancing module. Each load balancing module calculates and collects its own control plane traffic load metrics. The load balancing module publishes its corresponding metrics to the Pub-Sub node on NMS 300 at periodic intervals or upon request. The connection-transfer module subscribes to the Pub-Sub node.

The connection-transfer module monitors the control plane traffic load levels on each of the XMPP servers. When an individual XMPP server's control plane traffic load level exceeds a threshold or when other criteria are met, the connection transfer module may designate that server as an "overloaded" XMPP server. The connection transfer module will request a list of XMPP clients and their associated control plane traffic load levels from the overloaded XMPP server. Based on the XMPP client loads, the connection transfer module will decide which XMPP clients to transfer from the overloaded XMPP server. Although the Pub-Sub node and connection transfer module have been described in connection with NMS 300, these modules can reside on any XMPP server either together on one server or each module can reside on separate servers.

It should be noted that each of the core and aggregation servers 120(1) and 120(2) and each of the access XMPP servers 150(1)-150(4) may each have different processing capabilities. For example, depending on how network 100 was built out, the control cards on each of the XMPP servers may have different or newer/older versions of a processor, or the individual processor may each have a different number of processing cores like those found in scalable manufacturing lines of Reduced Instruction Set Computing (RISC) machines. As a result, the volume of control plane traffic that overloads one XMPP server may have a marginal effect on another XMPP server and vice versa. As an example, an 8 core server which is 80% utilized may be able to accept more additional load than a 2 core server that is 40% utilized.

Figure 4:
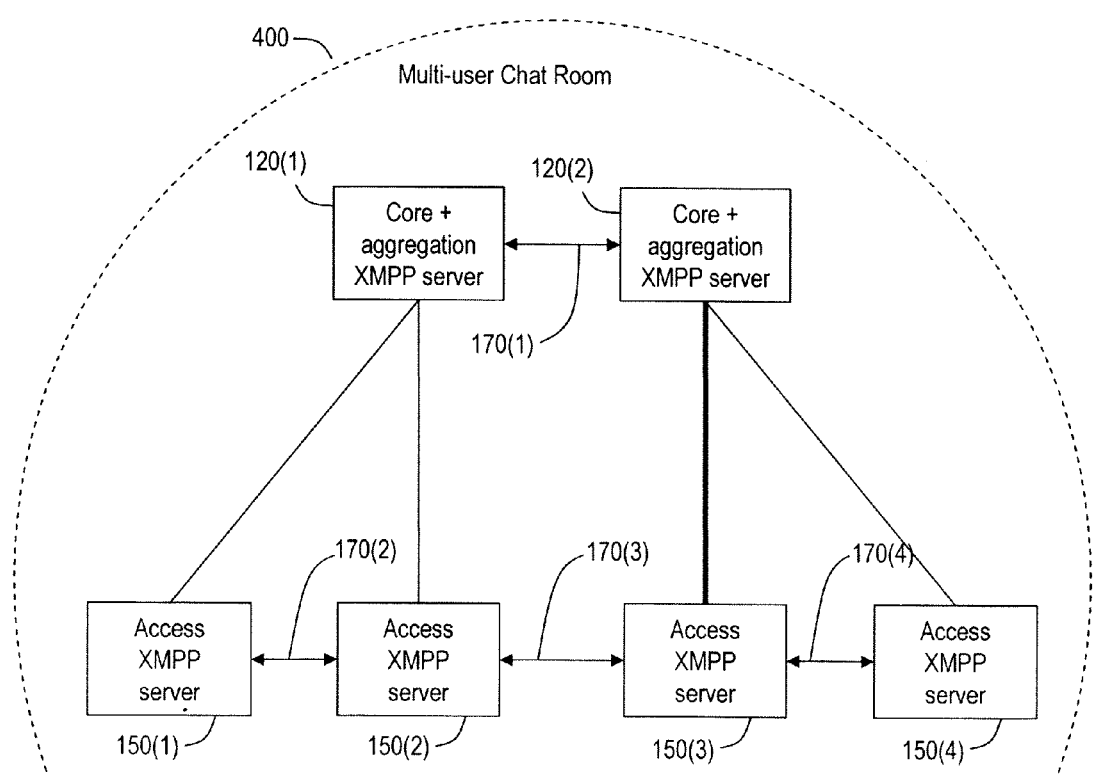
FIG. 4 depicts the XMPP server devices from FIG. 1 that have formed a multi-user chat room for decentralized control plane traffic load balancing.

Turning now to FIG. 4, the XMPP server devices from FIG. 1 are formed into a multi-user chat room 400 for decentralized control plane traffic load balancing. Each of the XMPP servers has a load balancing module that calculates and collects its own control plane traffic load metrics, as mentioned above. When setting up the data center XMPP server cluster, the network administrator creates a multi-user chat room that is hosted on one of the XMPP servers, e.g., one of the core and aggregation servers 120(1) and 120(2) or the access XMPP servers 150(1)-150(4). The name of the multi-user chat room is provided to each of the load balancing modules.

Each of the XMPP servers joins the multi-user chat room 400. Note that it is possible for the XMPP servers to be in different geographical locations or zones, e.g., for a worldwide instant messaging application such as Google Talk. In this type of situation, when the servers are widely dispersed, the network administrator can set up chat rooms on a per zone basis and only those servers in the zone will join the chat room. When a server's XMPP control plane traffic exceeds a programmed overload threshold or a dynamically adjusted threshold, the overloaded server broadcast a "help" or SOS request message to the chat room. Servers with available control plane traffic bandwidth will respond to the help message with a "rescue" message that indicates load availability or additional capacity that an underloaded server can support. For simplicity, the rescue message may be transmitted directly to the overloaded server without traversing the chat room, e.g., via links 170(1)-170(4).

When using distributed or decentralized load balancing approach like that described for multi-user chat room 400. Any load balancing decisions and threshold adjustments are made to prevent a repeated back and forth transfer (thrashing) or ping-ponging of client connections between XMPP servers. This is especially true when a stable load balancing scenario has been achieved as adding a few more clients could exceed several thresholds simultaneously and initiate an unnecessary cascade of connection transfer messages.

Figure 5:
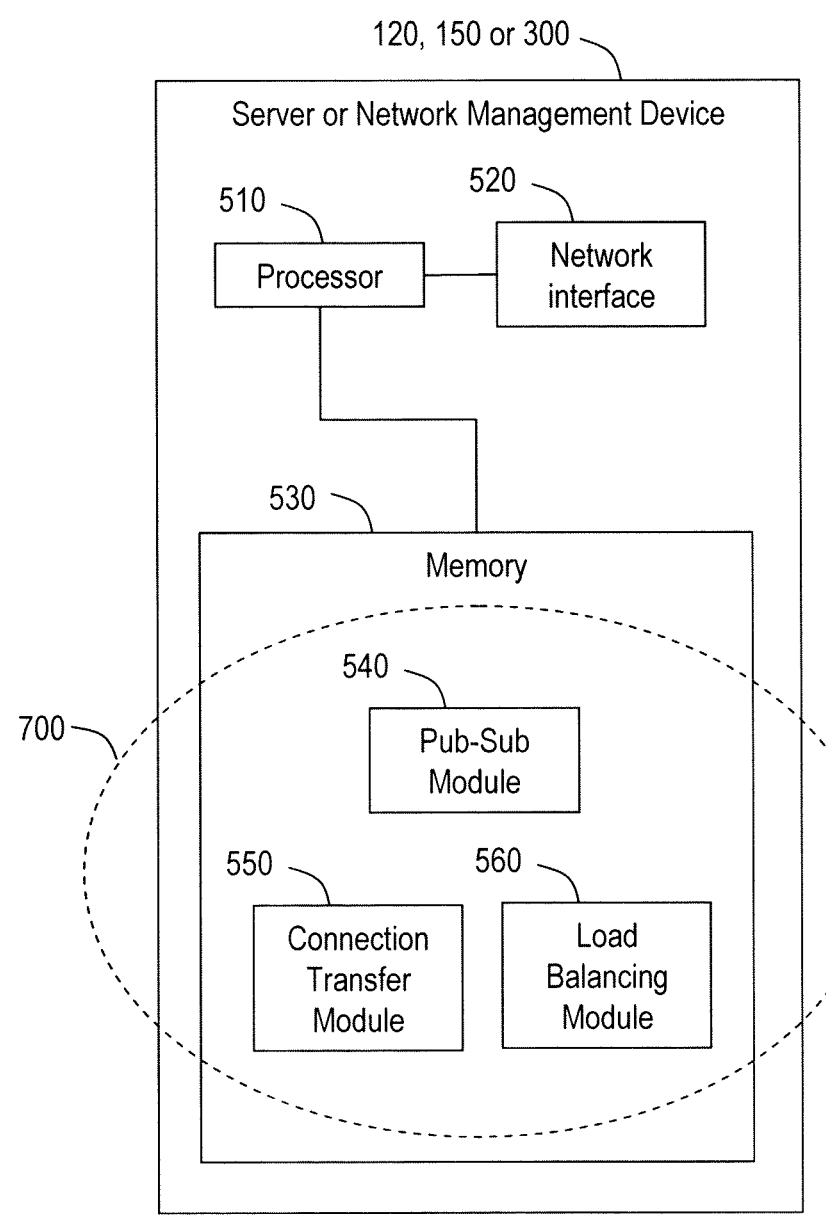
FIG. 5 is an example block diagram of a device configured to employ a centralized control plane traffic load balancing process.

Referring to FIG. 5, an example block diagram of a network device, e.g., one of the XMPP servers 120 or 150, or NMS 300, is shown and hereinafter referred to as NMS 300. The NMS 300 comprises a data processing device 510, a network interface unit 520, and a memory 530. Resident in the memory 530 is a Pub-Sub module 540, a connection transfer module 550 and a load balancing module 560. Collectively, the Pub-Sub module 540, the connection transfer module 550 and the load balancing module 560 are software configured to execute centralized XMPP control plane load balancing process 700 as indicated by the dashed oval. Briefly, process 700 centrally, i.e., by a single device, manages control plane traffic load among a plurality of XMPP servers as generally described above. The details of the centralized process 700 will be described in connection with FIG. 7.

The data processing device 510 may be a microprocessor, a microcontroller, systems on a chip (SOCs), or other fixed or programmable logic. The memory 530 may be any form of random access memory (RAM), FLASH memory, disk storage, or other tangible (non-transitory) memory media device that stores data used for the techniques described herein. The memory 530 may be separate or part of the processor 510. Instructions for performing the centralized process 700 may be stored in the memory 530 for execution by the processor 510 such that when executed by the processor, causes the processor to perform the functions describe herein in connection with FIG. 3. The network interface unit 520 enables communication over network 100. It should be understood that any of the devices in system 100 may be configured with a similar hardware or software configuration as NMS 300.

The functions of the processor 510 may be implemented by a processor or computer readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memory 530 stores data used for the computations or functions described herein (and/or to store software or processor instructions that are executed to carry out the computations or functions described herein). Thus, functions of the centralized process 700 may be implemented with fixed logic or programmable logic (e.g., software or computer instructions executed by a processor or field programmable gate array (FPGA)).

Figure 6:
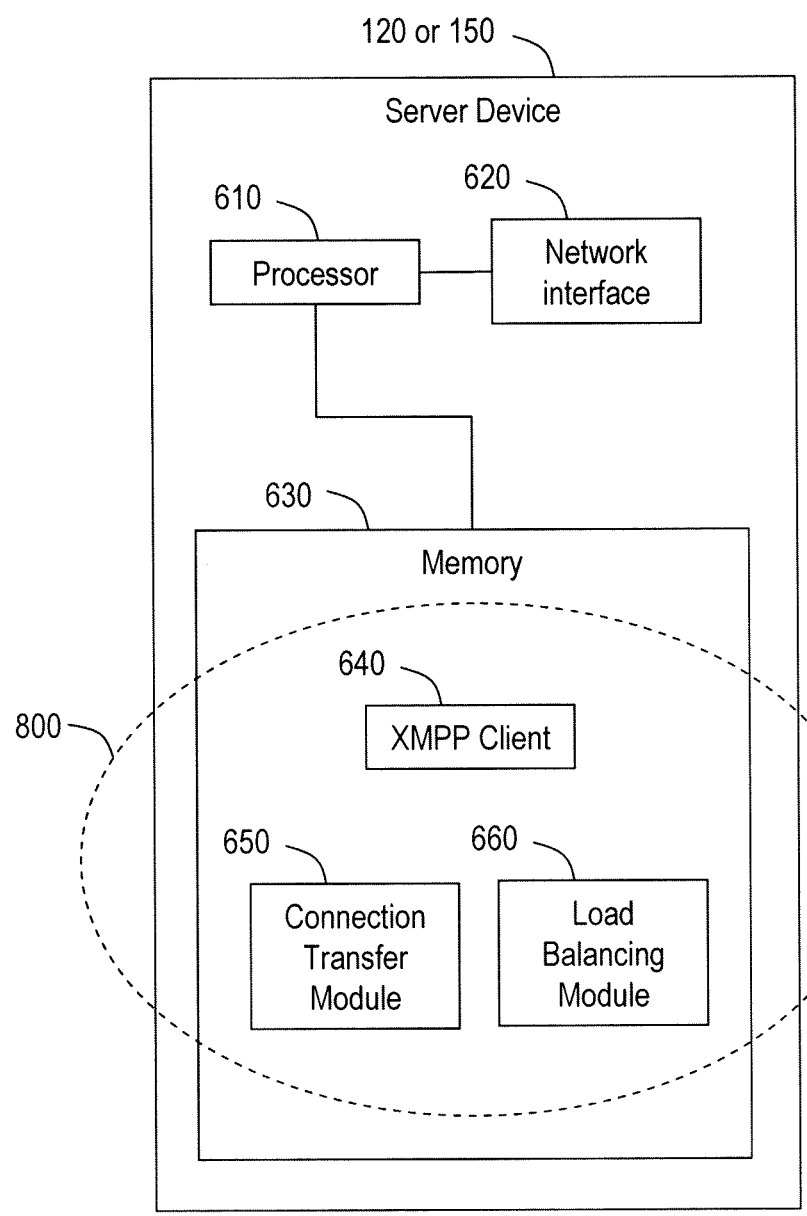
FIG. 6 is an example block diagram of a device configured to employ a decentralized control plane traffic load balancing process.

Referring to FIG. 6, an example block diagram of a server device, e.g., one of the XMPP servers 120 or 150 is shown and is hereinafter referred to as server 120. The server 120 comprises a data processing device 610, a network interface unit 620, and a memory 630. Resident in the memory 630 is an XMPP client 640, a connection transfer module 650 and a load balancing module 660. Collectively, the XMPP client 640, the connection transfer module 650 and the load balancing module 660 are software configured to execute decentralized XMPP control plane load balancing process 800 as indicated by the dashed oval. Briefly, process 800 manages control plane traffic load among a plurality of XMPP servers in a decentralized manner, where each server initiates its own connection transfer messages, as generally described above. The details of the decentralized process 800 will be described in connection with FIG. 8.

Figure 7:
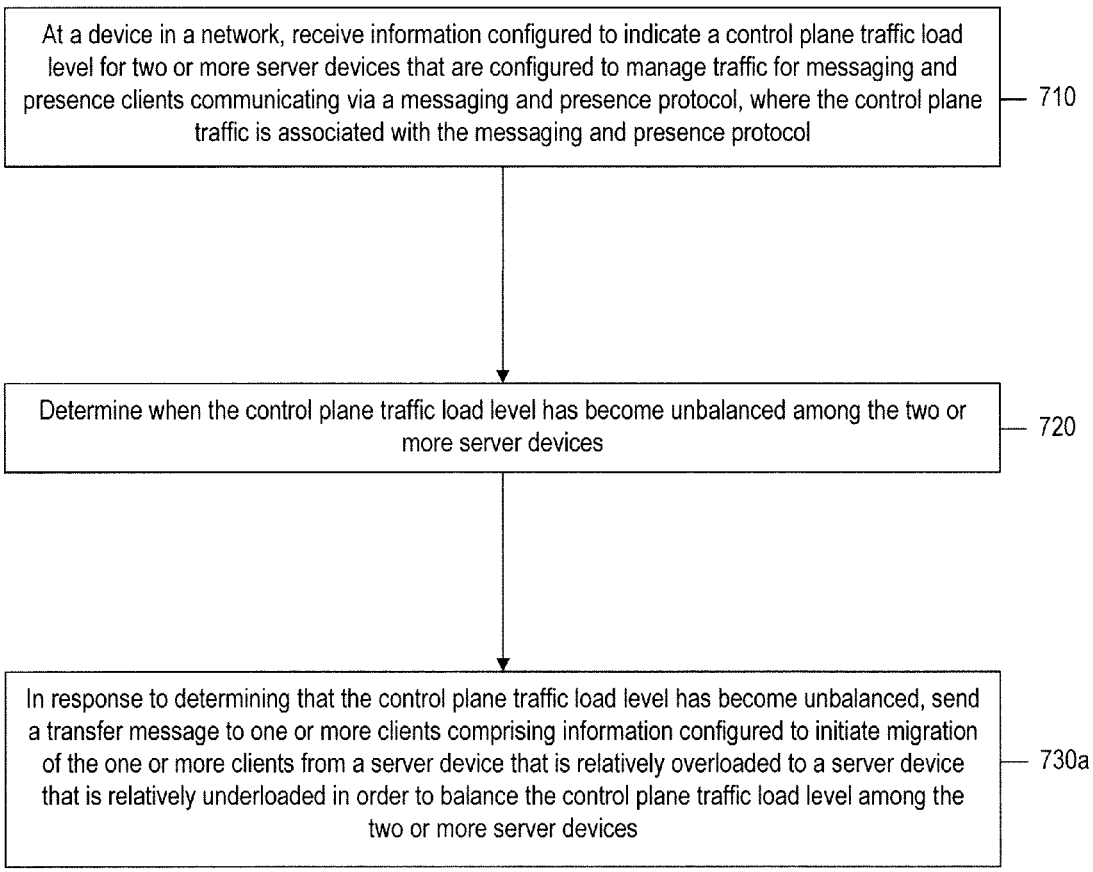
FIG. 7 is an example flowchart generally depicting the centralized control plane traffic load balancing process.

Turning now to FIG. 7, the centralized XMPP control plane load balancing process 700 will now be described. At 710, information is received at a device in a network configured to indicate a control plane traffic load level for two or more server devices that are configured to manage traffic for messaging and presence clients communicating via a messaging and presence protocol. The control plane traffic is associated with the messaging and presence protocol. At 720, it is determined when the control plane traffic load level has become unbalanced among the two or more server devices.

At 730, in response to determining that the control plane traffic load level for the server device exceeds the predetermined threshold, a transfer message is sent to one or more clients comprising information configured to initiate migration of the one or more clients from a server device that is relatively overloaded to a server device that is relatively underloaded in order to balance the control plane traffic load level among the two or more server devices. In addition, when a server is overloaded, any requests for a new client connection are rejected or redirected by the overloaded server and the network device may send an update request message to one or more underloaded servers comprising information configured to request that updated load levels be sent to the network device.

In addition to load levels, the information received may also be configured to indicate that one or more server devices are able to accommodate additional control traffic load. The transfer message sent to the one or more clients may comprise address information configured to indicate a server device that can accommodate additional control traffic load. When determining the control plane traffic load level one or more parameters may be used, e.g., a number of control plane traffic messages per unit of time, number of control plane traffic messages for each client, processor utilization, or memory utilization. The size of control plane traffic messages may be subdivided by a predetermined unit size whereby the number of control plane traffic messages per unit of time and the number of control plane traffic messages are based on the predetermined unit size.

In one example, the number of messages sent and received per unit time (number of transactions per unit time) is recorded for each client on every XMPP server in the network or server cluster. The recorded information indicates the load induced by each client and aids in deciding which client connections to transfer. Since each message is already processed by the server, incrementing a counter for each connection will add minimal computational overhead. The control plane traffic load can be totaled across all clients to get the total number of transactions per unit of time per server. The unit of time is programmable and determines how aggressive the load balancing mechanism is, e.g., a network administrator may want to load balance the cluster as soon as the total number of transactions of all clients on a server reaches a certain threshold, whereas another administrator may load balance if the load on a server reaches the threshold and stays there for an hour.

A second parameter, similar to a data packet maximum transmission unit (MTU) can be programmed so that larger messages get counted as multiple standard sized messages, thus normalizing the message count. This normalization mechanism is useful because larger messages take up more processor and memory resources, and therefore should be reflected in the load calculation. By examining the CPU utilization, memory usage, and total number of transactions per second for a server at any given time, the maximum number of transactions that a server can support can be extrapolated. Subtracting the current transactions per server from the extrapolated total provides the additional number of transactions that the server can take on. The additional capacity metric uniformly represents the remaining capacity of each XMPP server across a cluster irrespective of their processor and memory configuration and is a basic metric that can be exchanged between the XMPP servers or sent to the central load management device. An example XML formatted message is shown in Listing 1 below in which an XMPP client advertises XMPP server capability to another XMPP server or a Pub-Sub node:

Listing 1. Sample XML message advertising XMPP server load and excess capacity.

```
<iq type="set" id="msg_6">
    <pubsub xmlns="http://jabber.org/protocol/pubsub">
        <publish node="server_load ">
            <item>
                <total_capacity>
                    <value>15000</value>
                    <unit>TPS</unit>
                </total_capacity>
                <free_capacity>
                    <value>6000</value>
                    <unit>TPS<unit>
                </free_capacity>
                <server_utilization>
                    <value>40</value>
                    <unit>percent</unit>
                </server_utilization>
                <number_xmpp_clients>
                    <value>57</value>
                </number_xmpp_clients>
            </item>
        </publish>
    </pubsub>
</iq>
```

As can be seen from the code in Listing 1, a number of load and capability parameters are included.

In other examples, prior to sending the transfer message, a reservation request message may be sent to an underloaded server device comprising information configured to reserve a future client connection. Upon receiving an acknowledgement message from the underloaded server device comprising information configured to indicate that a connection has been reserved, the transfer message is then sent. A client load request message may also be sent to the overloaded server device comprising information configured to request control plane traffic load levels for each client serviced by the overloaded server device. When a client load response message is received from the overloaded server device that indicates the load levels for each client, a determination is made as to which clients to transfer with the transfer message based on the client load levels.

The centralized XMPP control plane load balancing process 700 may be implemented as a Pub-Sub module as mentioned above. The publish-subscribe module is hosted by a network device and is configured to periodically receive the information configured to indicate a control plane traffic load level that is published by one or more server devices. A connection transfer module configured to transfer clients from an overloaded server to an underloaded server may subscribe to the publish-subscribe module.

Thus, the centralized process 700 may comprise one Pub-Sub node that can be hosted on any server, a load-balancing module on every XMPP server, and a connection-transfer module that can be hosted on any server. The load balancing module collects and calculates the load balancing metrics described above and publishes to the Pub-Sub node the total transactions per server per unit time for each server after a programmable time interval. The load balancing module may also publish the complete list of transactions per client per unit time when requested to do so by the connection-transfer module.

For convenience, the connection-transfer module may be hosted on the same XMPP server that hosts the Pub-Sub node. The connection-transfer module subscribes to the Pub-Sub node to obtain the load balancing metrics. Whenever the total transactions per server per unit time for any server goes above a certain threshold specified by the administrator, the connection-transfer module will request that server's load-balancing module send it a list of transactions per client per unit time for all the clients running on it. The connection-transfer module then decides which client connections to transfer and to which XMPP server. An example procedure for setting up a system for implementing the centralized XMPP control plane load balancing process 700 is outlined below.

When setting up an XMPP server cluster, the network administrator configures one of the XMPP servers to host a Pub-Sub node and run the connection-transfer module. The administrator provides the connection-transfer module with the name of the Pub-Sub node. The connection-transfer module subscribes to this node. The administrator also configures the load-balancing modules on all the XMPP servers by providing them with the name of the Pub-Sub node as a configuration parameter. The load-balancing module on each server publishes the total transactions per server per unit time at regular intervals of time which can be specified by the administrator. The connection-transfer module receives this data for each server and when the total transactions per server per unit time for any server goes above a certain threshold, the connection-transfer module requests that server's load-balancing module to send its list of transactions per client per unit time. The connection-transfer module will decide which client connections should be transferred to which XMPP server in order to balance the load across the cluster.

The connection-transfer module uses algorithms to compute a number of transactions per client per unit time, a sum of transactions across all clients on a server (total transactions per server per unit time), a maximum number of transactions per unit time that a server can handle (extrapolated), and an additional number of transactions per unit time that the server can accommodate. After selecting the XMPP client connections to be transferred the connection-transfer module may send a list to the load-balancing module of the overloaded server. The overloaded server will send the connection transfer messages to the clients in the list. The connection-transfer module will not try and transfer any connections if there are no XMPP servers whose total transactions per server per unit time is below the administrator specified threshold. This mechanism prevents a repeated back and forth transfer (thrashing) of client connections between XMPP servers.

It may also be determined when the control plane traffic load level for the server device exceeds a predetermined threshold, and in response to determining that the control plane traffic load level for the server device exceeds the predetermined threshold, broadcasting a load balancing request message, e.g., to a multi-user chat room associated with the messaging and presence protocol. In other examples, it is determined when the control plane traffic load level for the server device exceeds a dynamically determined threshold. The dynamically determined threshold is adjusted dynamically based on the collective load levels of the two or more servers, and in response to determining that the control plane traffic load level for the server device exceeds the dynamically determined threshold, broadcasting the load balancing request message. By using predetermined and dynamically determined thresholds, race conditions or ping-ponging of clients may be prevented.

Referring now to FIG. 8, the decentralized XMPP control plane load balancing process 800 will now be described. Starting at 810, at a device in a network configured to host a multi-user chat room according to a messaging and presence protocol, a multi-user chat room is formed comprising two or more server devices. Each server device in the multi-user chat room collects control plane traffic metrics. At 820, it is determined at a server device when a control plane traffic load level for the server device has become unbalanced relative to other server devices. At 830, in response to determining that the control plane traffic load level for the server device has become unbalanced, a load balancing request message is broadcast to the other server devices via the multi-user chat room comprising information configured to indicate that the control plane traffic load level for the server device has become unbalanced.

At 840, a response to the load balancing request message is received from one or more of the other server devices comprising information configured to indicate that a corresponding server device is an underloaded server device that is able to accommodate additional control plane traffic. Only servers with available capacity will send a response to the load balancing request message. At 850, a transfer message is sent to one or more clients associated with the server device comprising information configured to instruct the one or more clients to migrate from the server device to a corresponding underloaded server device. Load balancing process 800 may also employ predetermined or dynamically determined thresholds as described above.

The responses to the load balancing request messages received from underloaded server devices may be analyzed in order to determine an appropriate underloaded server device that can accommodate a client transfer request. In one example, it is determined which clients have a lower control plane traffic load level and the transfer message is sent to a client with a lower control plane traffic load level so as to not disrupt a client with higher control plane traffic load. In another example, it is determined which clients have a higher control plane traffic load level and the transfer message sent to a client with higher control plane traffic load level in order to optimize control plane traffic for a greater number of clients.

Prior to sending the transfer message, a reservation request message may be sent to the corresponding underloaded server device comprising information configured to reserve a future client connection, as described above. After an acknowledgement message is received from the underloaded server device that comprises information configured to indicate that a connection has been reserved, the transfer message is sent. Also prior to sending the transfer message, a client load request message may be sent to the overloaded server device comprising information configured to request control plane traffic load levels for each client serviced by the overloaded server device. Once a client load response message is received from the overloaded server device comprising information configured to indicate the load levels for each client, a determination is made as to which clients to transfer with the transfer message based on the client load levels.

The decentralized XMPP control plane load balancing process 800 may comprise a multi-user chat (MUC) room that can be hosted on any server and a load-balancing module on every XMPP server. Connection transfer can be implemented by each individual XMPP server. An example procedure for setting up a system for implementing the decentralized process 800 will now be described.

When setting up the XMPP server cluster, the network administrator creates a multi-user chat (MUC) room. The name of the MUC is provided to the load-balancing server modules as a configuration parameter. The administrator specifies a threshold (max number of transactions per time per server) beyond which a server will not take on any more connections. This threshold may apply to all servers in the cluster when using normalized metrics. The administrator also specifies the unit of time over which to calculate the number of transactions. If the XMPP servers are in different geographical locations or zones, e.g., for worldwide IM application like Google Talk, then the administrator can setup a MUC per zone and only the servers in a particular zone will join the MUC. In this regard, whether using the centralized or decentralized processes, the connection transfer module may transfer clients based on client mobility. For example, when a virtual client moves to another pod within a data center or moves to another datacenter altogether, it may then be expedient to transfer those clients before transferring other clients.

The load balancing module on each server will collect metrics as described in connection with centralized process 700. When the current number of transactions per unit time of a server reaches or exceeds the predetermined threshold, the load balancing module sends a load-balancing request to the MUC. This initial message may only be a request for help and may contain no additional details about the server's load. All the other servers in the cluster will receive the request through the MUC. Only the servers that have their current number of transactions below the threshold will reply to the help request with the number of additional transactions per unit time that they can support. These servers will reply by sending a message directly to the overloaded server, as it is not necessary for all servers to receive the response through the MUC.

The load balancing module of the server that initiated the request will examine the responses and choose which client connections to transfer (and to which servers) based on a variety of algorithms, e.g., start transferring the connections with the lowest number of transactions so as to not disrupt the busier client connections with more transactions. The connection transfer module may transfer as many clients as necessary without increasing the control plane traffic load of other servers above the threshold or that will bring the overloaded server's load below the threshold, whichever comes first. If needed, the transfers may be split across many servers. The process or algorithms for multi-server transfers can be customized by the administrator.

The process of transferring a connection is as simple as the server sending a connection transfer message to the concerned client, since connection transfer messages are already supported by XMPP, e.g., using XEP-0051. The transfer can also be made into a two step process to prevent race conditions in extremely large clusters where there could be many simultaneous load balancing requests. First, the server module that initiated the load-balancing request will send a reservation message to a candidate server specifying the number of transactions that the client or clients being transferred will require. If the receiving server has not accepted a previous connection transfer and can support the specified number of transactions, then it will reply with an acknowledgement (ACK) message. At this point the receiving server will also reserve the specified number of transactions and not include that amount in any subsequent replies to load-balancing requests. Second, upon receiving the ACK, the initiating server will send the connection transfer message to the concerned XMPP client, specifying the IP address of the chosen server. The client will terminate its connection with the initiating server and establish a connection with the receiving server. The administrator can chose between the one or two step connection transfer mechanism. Setting a threshold (number of transactions) beyond which a server is considered overloaded and does not reply to load-balancing requests will prevent the back and forth transfer of clients (thrashing) as all servers approach their load limit.

Example XML messages for connection transfer are provided in the listings below:

Listing 2. Sample XML help request message.

```
<message from='server2@domain' to='load_balance@chat.domain' type='groupchat' id='lb5'>
    <body>
        <SOS-request>server2@domain</SOS-request>
    </body>
</message>
```

Listing 2 shows an example help request or SOS message.

Listing 3. Sample XML help request response message.

```
<message from='server4@domain' to='server2@domain' id='lb5'>
    <body>
        <SOS-reply>
        <additional_transactions_per_sec>1400</additional_transactions_per_sec>
        <SOS-reply>
    </body>
</message>
```

Listing 3 shows an example help request response message that contains an underloaded server's excess transaction capacity. In this message, the underloaded server's excess transaction capacity is 1400 transaction units per second.

Listing 4. Sample XML capacity reservation request message sent by an overloaded server.

```
<message from='server2@domain' to='server4@domain' id='lb5'>
    <body>
        <SOS-reserve>
        <additional_transactions_per_sec>70</additional_transactions_per_sec>
        <SOS-reserve>
    </body>
</message>
```

Listing 4 shows an example capacity reservation request message that contains a request by the overloaded server for 70 units of excess transaction capacity.

Listing 5. Sample XML capacity reservation request ACK message.

```
<message from='server4@domain' to='server2@domain' id='lb5'>
  <body>
    <SOS-ACK/>
  </body>
</message>
```

Listing 5 shows an example capacity reservation request ACK message. The ACK message indicates that the underloaded server has reserved the requested transaction request of 70 units.

In summary, the techniques described herein provide for centralized and decentralized control plane traffic load balancing for messaging and presence clients. The centralized approach provides for a device in a network to receive information configured to indicate a control plane traffic load level for one or more server devices that are configured to manage traffic for messaging and presence clients communicating via a messaging and presence protocol. The control plane traffic is associated with the messaging and presence protocol. It is determined when the control plane traffic load level has become unbalanced among the two or more server devices and in response to determining that the control plane traffic load level has become unbalanced, a transfer message is sent to one or more clients comprising information configured to initiate migration of one or more clients from a server device that is relatively overloaded to a server device that is relatively underloaded in order to balance the control plane traffic load level among the two or more server devices.

The control plane traffic load level may be determined by one or more parameters that include a number of control plane traffic messages per unit of time, a number of control plane traffic messages for each client, processor utilization, or memory utilization. The size of control plane traffic messages may be subdivided by a predetermined unit size, where the number of control plane traffic messages per unit of time and the number of control plane traffic messages is determined based on the predetermined unit size.

The decentralized approach provides for a device in a network that is configured to host a multi-user chat room according to a messaging and presence protocol. A multi-user chat room is formed comprising two or more server devices. Each server device in the multi-user chat room collects control plane traffic metrics. It is determined at a server device when a control plane traffic load level for the server device exceeds a predetermined threshold. In response to determining that the control plane traffic load level for the server device exceeds the predetermined threshold, a load balancing request message is broadcast to the other server devices via the multi-user chat room that comprises information configured to indicate that the control plane traffic load level for the server device exceeds the predetermined threshold.

A response to the load balancing request message is received from one or more of the other server devices comprising information configured to indicate that a corresponding server device is an underloaded server device that is able to accommodate additional control plane traffic. Only servers with available capacity will send a response to the load balancing request message. A transfer message is sent to one or more clients associated with the server device comprising information configured to instruct the one or more clients to migrate from the server device to a corresponding underloaded server device.

In the above examples, various techniques have been described in connection with the centralized process and other techniques have been described in connection with the decentralized process. It should be appreciated that many of the techniques described herein are interchangeable with respect to either the centralized or decentralized process, e.g., metric calculations and switching algorithms may be shared among both processes.

The above description is intended by way of example only.

What is claimed is:

1. A method comprising:
   at a device in a network, receiving information configured to indicate a messaging and presence protocol control plane traffic load level for two or more server devices that are configured to manage traffic for messaging and presence clients communicating via the messaging and presence protocol, wherein the messaging and presence protocol control plane traffic comprises control information for the messaging and presence protocol the messaging and presence protocol;
   determining when the messaging and presence protocol control plane traffic load level has become unbalanced among the two or more server devices; and
   in response to determining that the messaging and presence protocol control plane traffic load level has become unbalanced, sending a transfer message to one or more clients comprising information configured to initiate migration of the one or more clients from a server device that is relatively overloaded to a server device that is relatively underloaded in order to balance the messaging and presence protocol control plane traffic load level among the two or more server devices.

2. The method of claim 1, wherein in response to determining that the messaging and presence protocol control plane traffic load level has become unbalanced, further comprises rejecting or redirecting by relatively overloaded server devices any requests for new client connections.

3. The method of claim 1, wherein in response to determining that the messaging and presence protocol control plane traffic load level has become unbalanced, further comprises sending an update request message to one or more relatively underloaded servers comprising information configured to request that updated load levels be sent to the network device.

4. The method of claim 1, wherein receiving comprises receiving information configured to indicate that one or more server devices are able to accommodate additional messaging and presence protocol control plane traffic load.

5. The method of claim 4, wherein sending the transfer message to the one or more clients comprises sending address information configured to indicate a server device that can accommodate additional messaging and presence protocol control plane traffic load.

6. The method of claim 1, wherein determining the messaging and presence protocol control plane traffic load level comprises determining one or more parameters comprising a number of messaging and presence protocol control plane traffic messages per unit of time, number of messaging and presence protocol control plane traffic messages for each client, processor utilization, or memory utilization.

7. The method of claim 6, further comprising subdividing messaging and presence protocol control plane traffic messages by a predetermined unit size, and wherein determining comprises determining the number of messaging and presence protocol control plane traffic messages per unit of time and the number of messaging and presence protocol control plane traffic messages based on the predetermined unit size.

8. The method of claim 1, further comprising:
prior to sending the transfer message, sending a reservation request message to the underloaded server device comprising information configured to reserve a future client connection;
receiving an acknowledgement message from the underloaded server device comprising information configured to indicate that a connection has been reserved; and
in response to receiving the acknowledgement message, sending the transfer message.

9. The method of claim 1, further comprising:
prior to sending the transfer message, sending a client load request message to the overloaded server device comprising information configured to request messaging and presence protocol control plane traffic load levels for each client serviced by the overloaded server device;
receiving a client load response message from the overloaded server device comprising information configured to indicate the load levels for each client; and
determining which clients to transfer with the transfer message based on the client load levels.

10. The method of claim 1, further comprising:
hosting by the network device a publish-subscribe module configured to periodically receive the information configured to indicate a messaging and presence protocol control plane traffic load level that is published by the one or more server devices; and
subscribing to the publish-subscribe module by a connection transfer module configured to transfer clients from an overloaded server to an underloaded server.

11. The method of claim 1, wherein determining comprises determining when the messaging and presence protocol control plane traffic load level exceeds a predetermined threshold, and further comprises:
in response to determining that the messaging and presence protocol control plane traffic load level for the server device exceeds the predetermined threshold:
designating the server device as an overloaded server device; and
sending the transfer message to one or more clients associated with the overloaded server device comprising information configured to initiate migration of one or more clients from the overloaded server device to an underloaded server device.

12. The method of claim 1, wherein determining comprises determining when the messaging and presence protocol control plane traffic load level for the server device exceeds a dynamically determined threshold, wherein the dynamically determined threshold is adjusted dynamically based on the collective load levels of the two or more servers, and further comprises in response to determining that the messaging and presence protocol control plane traffic load level for the server device exceeds the dynamically determined threshold, sending the transfer message.

13. The method of claim 1, wherein the messaging and presence protocol is the Extensible Messaging and Presence Protocol.

14. A method comprising:
at a device in a network configured to host a multi-user chat room according to a messaging and presence protocol, forming a multi-user chat room comprising two or more server devices, wherein each server device in the multi-user chat room collects messaging and presence protocol control plane traffic metrics for the messaging and present protocol, wherein the messaging and presence protocol control plane traffic comprises control information for the messaging and presence protocol;
determining at a server device when a messaging and presence protocol control plane traffic load level for the server device has become unbalanced relative to other server devices;
in response to determining that the messaging and presence protocol control plane traffic load level for the server device has become unbalanced, broadcasting a load balancing request message to the other server devices via the multi-user chat room comprising information configured to indicate that the messaging and presence protocol control plane traffic load level for the server device has become unbalanced;
receiving a response to the load balancing request message from one or more of the other server devices comprising information configured to indicate that a corresponding server device is an underloaded server device that is able to accommodate additional messaging and presence protocol control plane traffic; and
sending a transfer message to one or more clients associated with the server device comprising information configured to instruct the one or more clients to migrate from the server device to a corresponding underloaded server device.

15. The method of claim 14, further comprising analyzing the responses to the load balancing request messages received from underloaded server devices in order to determine an appropriate underloaded server device that can accommodate a client transfer request.

16. The method of claim 15, wherein analyzing further comprises:
determining which clients have a lower messaging and presence protocol control plane traffic load level; and
sending the transfer message to one of the clients with such a lower messaging and presence protocol control plane traffic load level.

17. The method of claim 16, wherein analyzing further comprises:
determining which clients have a higher messaging and presence protocol control plane traffic load level; and
sending the transfer message to one of the clients with such a higher messaging and presence protocol control plane traffic load level.

18. The method of claim 14, further comprising:
prior to sending the transfer message, sending a reservation request message to the corresponding underloaded server device comprising information configured to reserve a future client connection;
receiving an acknowledgement message from the underloaded server device comprising information configured to indicate that a connection has been reserved; and in response to receiving the acknowledgement message, sending the transfer message.

19. The method of claim 14, further comprising:
prior to sending the transfer message, sending a client load request message to the overloaded server device comprising information configured to request messaging and presence protocol control plane traffic load levels for each client serviced by the overloaded server device;
receiving a client load response message from the overloaded server device comprising information configured to indicate the load levels for each client; and
determining which clients to transfer with the transfer message based on the client load levels.

20. The method of claim 14, wherein determining comprises determining when the messaging and presence protocol control plane traffic load level for the server device exceeds a predetermined threshold, and further comprises in response to determining that the messaging and presence protocol control plane traffic load level for the server device exceeds the predetermined threshold, broadcasting the load balancing request message.

21. The method of claim 14, wherein determining comprises determining when the messaging and presence protocol control plane traffic load level for the server device exceeds a dynamically determined threshold, wherein the dynamically determined threshold is adjusted dynamically based on the collective load levels of the two or more servers, and further comprises in response to determining that the messaging and presence protocol control plane traffic load level for the server device exceeds the dynamically determined threshold, broadcasting the load balancing request message.

22. The method of claim 14, wherein the messaging and presence protocol is the Extensible Messaging and Presence Protocol.

* * * * *